United States Patent
Rajiv et al.

(10) Patent No.: US 10,678,520 B2
(45) Date of Patent: Jun. 9, 2020

(54) REPLACEMENT ALGORITHM SELECTION PLATFORM

(71) Applicant: General Electric Company, Schenectady, NY (US)

(72) Inventors: Vrinda Rajiv, Niskayuna, NY (US); Bradford Miller, Malta, NY (US); Kirk Lars Bruns, Waitsfield, VT (US); Michael Kinstrey, Niskayuna, NY (US); Charles Theurer, Alplaus, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/939,804

(22) Filed: Mar. 29, 2018

(65) Prior Publication Data
US 2019/0303112 A1 Oct. 3, 2019

(51) Int. Cl.
*G06F 9/44* (2018.01)
*G06F 8/36* (2018.01)
(Continued)

(52) U.S. Cl.
CPC .................. *G06F 8/36* (2013.01); *G06F 8/60* (2013.01); *G06F 8/70* (2013.01); *G06F 11/3409* (2013.01)

(58) Field of Classification Search
CPC ..... G06F 8/36; G06F 8/60; G06F 8/70; G06F 11/3409
(Continued)

(56) References Cited

U.S. PATENT DOCUMENTS

| 8,214,308 B2* | 7/2012 | Chu ........................ G06N 20/00 706/14 |
| 9,020,868 B2* | 4/2015 | Elkins .................... G06N 5/022 706/15 |

(Continued)

OTHER PUBLICATIONS

Technical Whitepaper, "Predix Architecture and Services", Sep. 2015, Ge Digital, 30 pages (Year: 2015).*

(Continued)

*Primary Examiner* — Ted T. Vo
(74) *Attorney, Agent, or Firm* — Buckley, Maschoff & Talwalkar LLC

(57) ABSTRACT

An algorithm data store may contain information about a pool of available algorithms. An algorithm analysis engine may compare the information about each of the pool of available algorithms with at least one requirement associated with the current algorithm executing in the live environment. Based on the comparison, the algorithm analysis engine may select at least one of the pool of available algorithms as a potential replacement algorithm and transmit an indication of the selected at least one potential replacement algorithm. A deployment platform may include a lifecycle manager that manages execution of the current algorithm in the live environment. The lifecycle manager may also receive the indication of the selected at least one potential replacement algorithm, manage execution of the at least one potential replacement algorithm in a shadow environment, and report performance information associated with the current algorithm and the at least one potential replacement algorithm.

11 Claims, 13 Drawing Sheets

(51) Int. Cl.
*G06F 8/70* (2018.01)
*G06F 11/34* (2006.01)
*G06F 8/60* (2018.01)

(58) Field of Classification Search
USPC .................................. 717/101–104, 120–123
See application file for complete search history.

(56) References Cited

U.S. PATENT DOCUMENTS

| | | | |
|---|---|---|---|
| 9,690,575 | B2 | 6/2017 | Primson et al. |
| 2004/0181441 | A1 | 9/2004 | Fung et al. |
| 2009/0106178 | A1 | 4/2009 | Chu et al. |
| 2012/0179494 | A1 | 7/2012 | He et al. |
| 2015/0142713 | A1 | 5/2015 | Gopinathan et al. |
| 2017/0091673 | A1 | 3/2017 | Gupta et al. |
| 2017/0132548 | A1* | 5/2017 | Majumder ....... G06Q 10/06315 |
| 2017/0193066 | A1 | 7/2017 | Zhu et al. |
| 2017/0286102 | A1 | 10/2017 | Prisom et al. |

OTHER PUBLICATIONS

Pivarski et al., "Deploying Analytics with the Portable Format for Analytics (PFA)", 2016, ACM, pp. 579-588 (Year: 2016).*

IBM, "IBM SPSS Modeler 18.1.1 Deployment Guide", 2017, IBM Corporation, 41 pages (Year: 2017).*

Compos, Marcos M. "Real-Time Scoring & Model Management 1—Life Cycle", Oracle Data Mining and Analytics, Feb. 21, 2006, http://oracledmt.blogspot.in/2006/02/real-time-scoring-model-management-1.html, 4pgs.

Nath, Shyam Varan "Champion-Challenger Based Predictive Model Selection", IProceedings 2007 IEEE SoutheastCon, Richmond, VA, 2007, (pp. 254-254, 1 total page).

Chu, Robert et al., "Best Practices for Managing Predictive Models in a Production Environment", retrieved from https://www.mwsug.org/proceedings/2007/saspres/MWSUG-2007-SAS02.pdf, date retrieved Mar. 29, 2018, (pp. 1-10, 10 total pages).

Accenture Labs, "Delivering Improved Insights with Automated Analytics Model management framework simplifies model deployment at scale", 2016, Retrieved from https://www.accenture.com/t20160814T210959Z__w__/us-en/_acnmedia/PDF-28/Accenture-Delivering-Improved-Insights-Automated-Analytics.pdf, (pp. 1-12, 12 total pages).

Gualtieri, Mike "The Forrester Wave: Predictive Analytics and Machine Learning Solutions", Q1 2017 Enterprises Must Possess the Power to Predict in the Age of the Customer, Mar. 7, 2017, 16pgs.

Knime, "The Seven Steps to Model Management", Sep. 18, 2017, Retrieved from https://www.knime.com/blog/the-seven-steps-to-model-management, retrieved date Mar. 29, 2018, (pp. 1-7, 7 total pages).

Shukla, Vinay "Data Science for the Modern Data Architecture", Sep. 20, 2017, Retrieved from https://hortonworks.com/blog/data-science-modern-data-architecture/, retrieved date Mar. 29, 2018, (pp. 1-6, 6 total pages).

\* cited by examiner

| ALGORITHM IDENTIFIER 1202 | METADATA 1204 | CONTEXT 1206 | STATUS 1208 |
|---|---|---|---|
| A_101 | INPUT-01; OUTPUT_02 | LAT/LONG | BEING EVALUATED |
| A_102 | 2 GIG MEMORY; RGB CAMERA | TEMPERATURE | CHAMPION |
| A_103 | 80 PERCENT ACCURACY | VISIBILITY | NOT SUITABLE |

*FIG. 12*

REPLACEMENT ALGORITHM SELECTION PLATFORM

BACKGROUND

Some embodiments disclosed herein relate to selection of an algorithm and, more particularly, to systems and methods providing a replacement algorithm selection platform.

An enterprise might use one or more algorithms to facilitate, for example, the operation of an industrial asset. For example, a power company might use an algorithm to look for and/or predict problems with wind turbine blades. The enterprise might periodically look to improve the performance of such algorithms, such as by manually testing new algorithms to see if they operate better than existing ones (and, if so, replacing the existing algorithm with the improved version). Such an approach, however, can be a time consuming, expensive, and error prone task—especially when the algorithms are complex.

The creation, use, evaluation, etc. of algorithms might be associated with a "cloud" portion (e.g., utilizing shared computing resources via a communication network) and/or a local "edge" portion (e.g., located local to an industrial asset site), often referred to as an "edge-to-cloud" implementation. In some cases, an owner or operator might not want to share specific details about the operation of an industrial asset details (e.g., turbine speed, power loads, temperature sensor data, etc.). For example, the owner or operator might want to keep such details confidential for security reasons, privacy concerns, protection of trade secrets, etc. It would therefore be desirable to provide systems and methods to efficiently and accurately address these issues when providing a replacement algorithm selection platform.

SUMMARY

According to some embodiments, a system may include an algorithm data store that contains information about a pool of available algorithms. An algorithm analysis engine may compare the information about each of the pool of available algorithms with at least one requirement associated with the current algorithm executing in the live environment. Based on the comparison, the algorithm analysis engine may select at least one of the pool of available algorithms as a potential replacement algorithm and transmit an indication of the selected at least one potential replacement algorithm. A deployment platform may include a lifecycle manager that manages execution of the current algorithm in the live environment. The lifecycle manager may also receive the indication of the selected at least one potential replacement algorithm, manage execution of the at least one potential replacement algorithm in a shadow environment, and report performance information associated with the current algorithm and the at least one potential replacement algorithm.

Some embodiments comprise: means for accessing, by an algorithm analysis engine, an algorithm data store containing information about a pool of available algorithms; means for comparing, by the algorithm analysis engine, the information about each of the pool of available algorithms with at least one requirement associated with a current algorithm executing in a live environment; based on said comparison, means for selecting, by the algorithm analysis engine, at least one of the pool of available algorithms as a potential replacement algorithm; means for transmitting, by the algorithm analysis engine, an indication of the selected at least one potential replacement algorithm; means for managing, by a lifecycle manager at a deployment platform, execution of the current algorithm in the live environment; means for receiving, by the lifecycle manager from the algorithm analysis engine, the indication of the selected at least one potential replacement algorithm; means for managing, by the lifecycle manager, execution of the at least one potential replacement algorithm in a shadow environment; and means for reporting, by the lifecycle manager, performance information associated with the current algorithm and the at least one potential replacement algorithm.

Technical effects of some embodiments of the invention may include improved and computerized ways to efficiently and accurately provide a replacement algorithm selection platform. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 12 is a portion of a tabular catalog data store in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
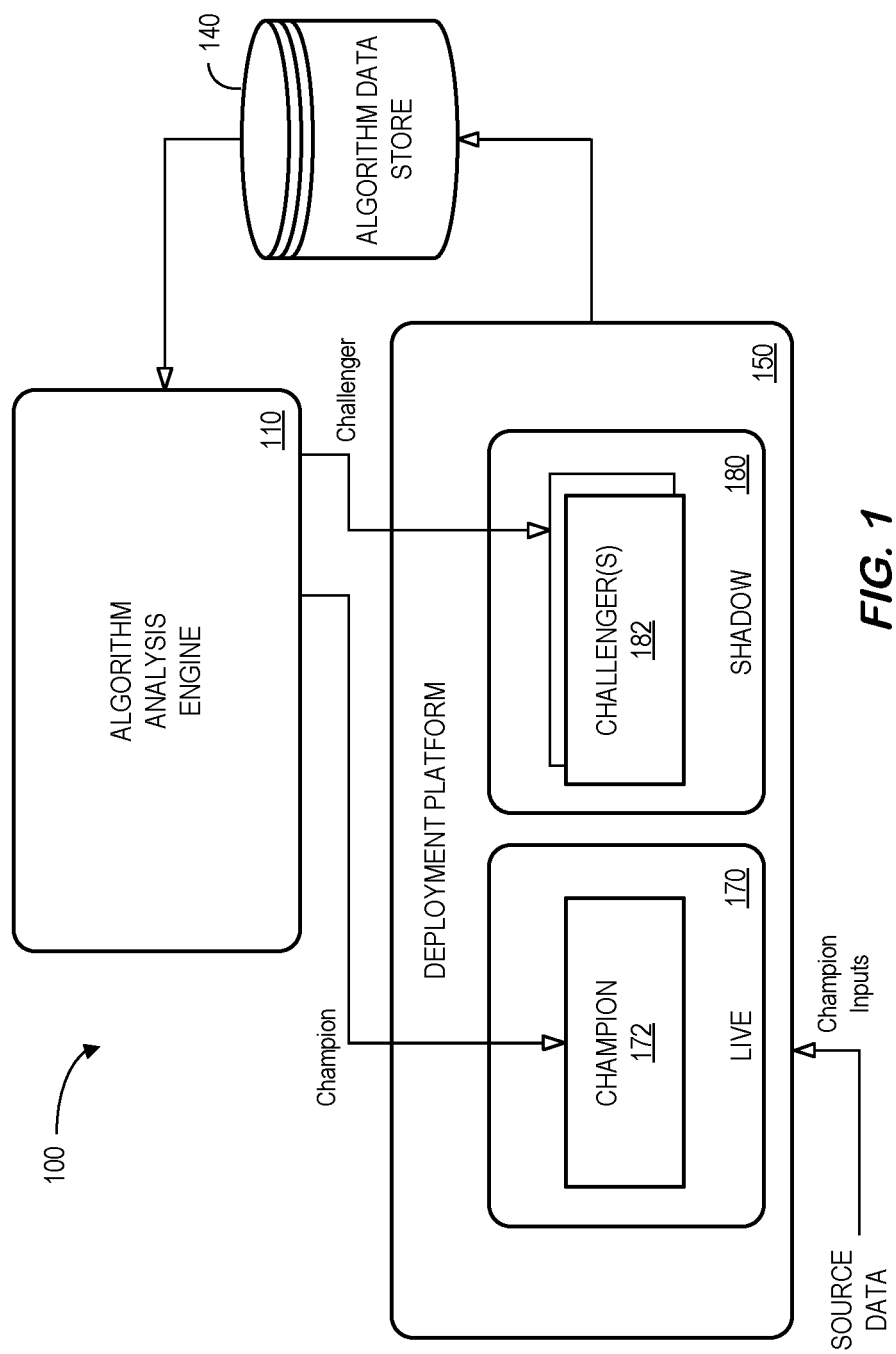
FIG. 1 is a high-level block diagram of a system according to some embodiments.

It may generally be desirable to efficiently and accurately facilitate selection of potential replacement "algorithms" associated with a current algorithm executing in a real environment (e.g., a solar farm, turbine, factory, aircraft, etc.). As used herein, the term "algorithm" might refer to any application, program, formula, etc. that facilitates operation of an industrial asset. FIG. 1 is a high-level block diagram of a system 100 associated with a current or "champion" algorithm 172 executing in a real or "live" environment 170 (e.g., a factory, wind turbine, jet engine, dam, etc.) according to some embodiments. In particular, the system 100 includes a deployment platform 150 able to write information to an algorithm data store 140.

According to some embodiments, the algorithm data store 140 stores electronic records containing, for example, a catalog with metadata about a pool of available algorithms that could potentially replace the champion algorithm 172. According to some embodiments, the deployment platform 150 and/or other elements of the system such as an algorithm analysis engine 110 may then determine which of those algorithms should be evaluated and compared to the champion algorithm 172. This might be done, for example, by selecting one or more algorithms to be executed as "challenger" algorithms 182 consuming source data in a shadow environment 180. Note that the deployment platform 150 could be completely de-centralized, cloud-based, and/or might be associated with a third party, such as a vendor that performs a service for an enterprise.

The deployment platform 150 and/or algorithm analysis engine 110 might be, for example, associated with a Personal Computer ("PC"), laptop computer, a tablet computer, a smartphone, an enterprise server, a server farm, and/or a database or similar storage devices. According to some embodiments, an "automated" deployment platform 150 and/or algorithm analysis engine 110 may automatically select challenger algorithms. As used herein, the term "automated" may refer to, for example, actions that can be performed with little (or no) intervention by a human.

As used herein, devices, including those associated with the deployment platform 150, algorithm analysis engine 110, and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The deployment platform 150 and/or algorithm analysis engine 110 may store information into and/or retrieve information from data stores. The data stores might, for example, store electronic records representing historical data, existing algorithms, components that might be combined to create an algorithm, etc. The data stores may be locally stored or reside remote from the deployment platform 150. Although a single deployment platform 150 and algorithm analysis engine 110 are shown in FIG. 1, any number of such devices may be included. Moreover, various devices described herein might be combined according to embodiments of the present invention. In some embodiments, the deployment platform 150, algorithm data store 140, and/or other devices might be co-located and/or may comprise a single apparatus. For example, the deployment platform 150 and/or algorithm analysis engine 110 might be associated with a single network cloud-hosted topology, a multiple network cloud-hosted topology, a participant hosted intranet environment, etc.

Figure 2:
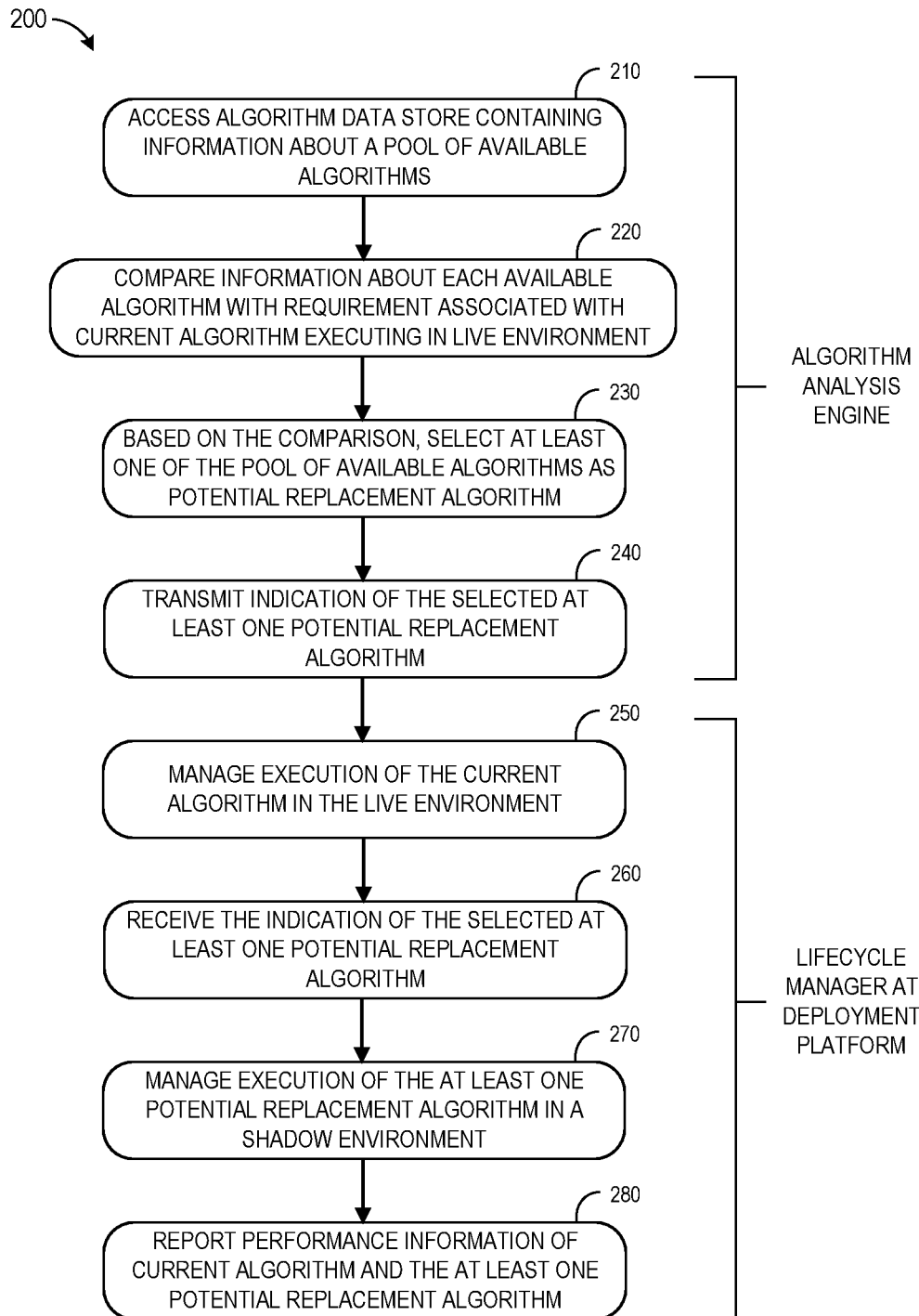
FIG. 2 is a method to provide a replacement algorithm selection platform in accordance with some embodiments.

In this way, the system 100 may efficiently and accurately provide a replacement algorithm selection platform. For example, FIG. 2 is a method 200 associated with a current algorithm executing in a real environment (a "champion" algorithm) in accordance with some embodiments. The flow charts described herein do not imply a fixed order to the steps, and embodiments of the present invention may be practiced in any practicable order. Note that any of the methods described herein may be performed by hardware, software, or any combination of these approaches. For example, a computer-readable storage medium may store thereon instructions that when executed by a machine result in performance according to any of the embodiments described herein.

At 210, an algorithm analysis engine may access an algorithm data store containing information about a pool of available algorithms. The information about the pool of available algorithms might include, for example, metadata such as an identifier, a description, an implementation type, a version, input data, output data, a resource requirement, context information, historical performance data, an author, compliance information, license information, etc.

At 220, the algorithm analysis engine may compare the information about each of the pool of available algorithms with at least one requirement associated with the current algorithm executing in the live environment. According to some embodiments, the algorithm analysis engine might perform several tasks, such as an identification process, a selection process, a qualification process, a monitoring process, an evaluation process, a deployment process, etc. Based on the comparison, at 230 the algorithm analysis engine may select at least one of the pool of available algorithms as a potential replacement algorithm (a "challenger" algorithm). According to some embodiments, the algorithm analysis engine may further select the at least one potential replacement algorithm based on algorithm execution context information. At 240, the algorithm analysis engine may transmit an indication of the selected at least one potential replacement algorithm.

At 250, a lifecycle manager at a deployment platform may manage execution of the current algorithm in the live environment. At 260, the lifecycle manager may receive, from the algorithm analysis engine, the indication of the selected at least one potential replacement algorithm. At 270, the lifecycle manager may manage execution of the at least one potential replacement algorithm in a shadow environment in a manner that does not alter the live environment. At 280, the lifecycle manager may report performance information associated with the current algorithm and the at least one potential replacement algorithm. According to some embodiments, the lifecycle manager may also monitor the live environment (e.g., measuring performance parameters, identifying computer resource values, etc.).

This performance information might be used, for example, to determine if the potential replacement algorithm should, in fact, replace the current algorithm. For example, according to some embodiments the algorithm analysis engine is further to compare performance of the at least one potential replacement algorithm with performance of the current algorithm in the live environment. When the performance of a potential replacement algorithm exceeds performance of the current algorithm in the live environment, the algorithm analysis engine may arrange for that potential replacement algorithm to become the current algorithm. The comparison of performances might be based on, for example, an accuracy, a precision, a level of confidence, speed, compute resources, any other computing criteria, etc.

Figure 3:
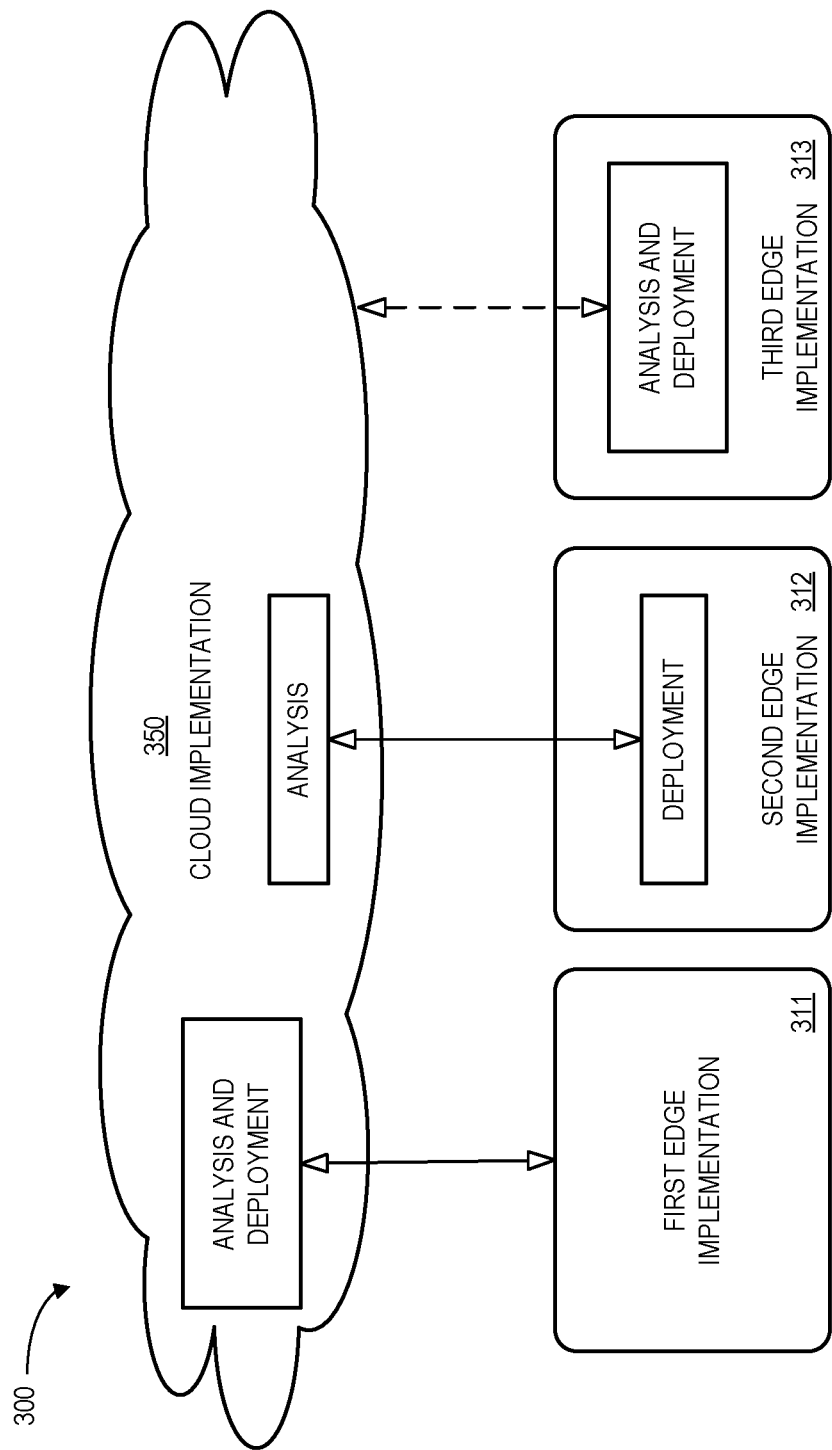
FIG. 3 illustrates edge-to-cloud implementations according to various embodiments.
Figure 4:
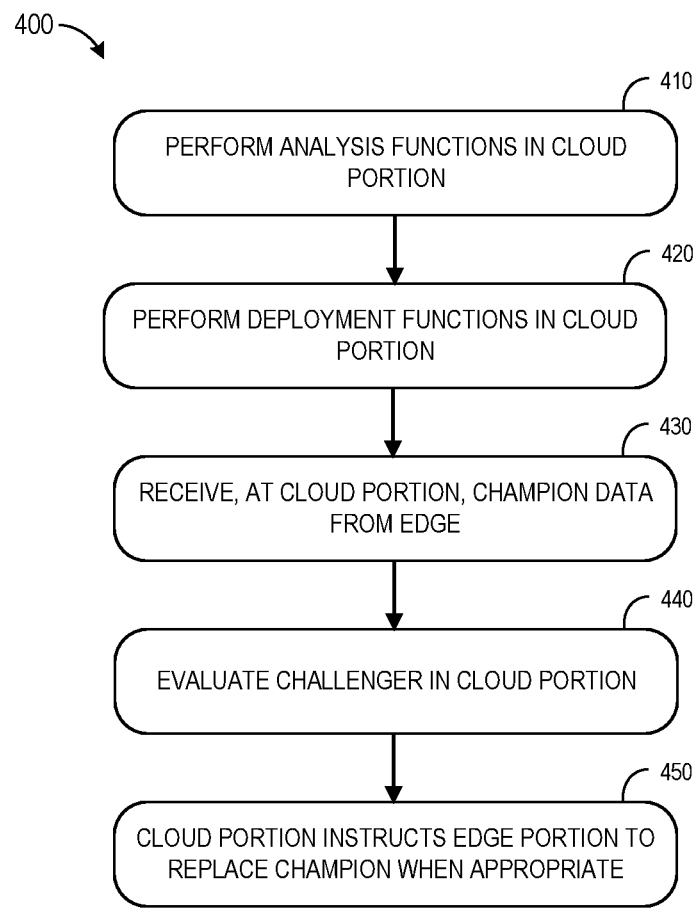
FIG. 4 is a method associated with a cloud-based implementation in accordance with some embodiments.

Note that the algorithm analysis engine and/or the lifecycle manager at the deployment platform might be implemented via an edge-to-cloud architecture. For example, FIG. 3 illustrates edge-to-cloud implementations 300 according to various embodiments. In some cases, at least some of the algorithm analysis engine and deployment platform are implemented in a cloud portion of a cloud-to-edge implementation. For example, in the first edge implementation 311 all of the analysis and deployment is performed in a cloud 350. FIG. 4 is a method 400 associated with a cloud-based implementation in accordance with some embodiments. At 410, the analysis functions are performed in the cloud 350 (e.g., to select a potential challenger). At 420, the deployment functions are performed in the cloud 350 (e.g., to transmit deployment information to the first edge implementation 311). At 430, the cloud 350 may receive champion data from the first edge implementation 311. The cloud 350 may then evaluate the challenger at 440 and instruct the first edge implementation 311 to replace the champion when appropriate at 450. Note that in this implementation, the analysis and deployment might use information from the first edge implementation 311 to enhance the performance of algorithms at other edge implementations. According to some embodiments, a shadow environment might be implemented in an edge portion, a cloud portion, and/or a cloud-to-edge implementation.

Figure 5:
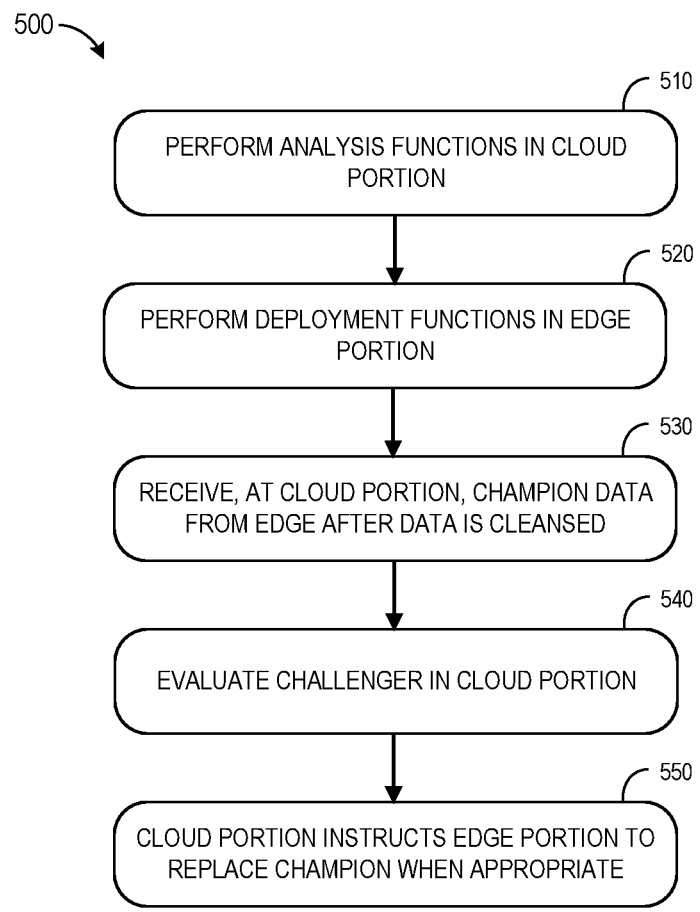
FIG. 5 is a method associated with a partially cloud-based and partially edge-based implementation according to some embodiments.

Referring again to FIG. 3, in some cases at least some of the algorithm analysis engine is implemented in the cloud portion 350 of a cloud-to-edge implementation and at least a portion of the deployment platform is implemented in an edge portion at an industrial site associated with the live environment. For example, in the second edge implementation 312 the analysis is performed in the cloud 350 and the deployment is performed at the second edge implementation 212. FIG. 5 is a method 500 associated with a partially cloud-based and partially edge-based implementation in accordance with some embodiments. At 510, the analysis functions are performed in the cloud 350 (e.g., to select a potential challenger). At 520, the deployment functions are performed at the second edge implementation 312. At 530, the cloud 350 may receive champion data from the second edge implementation 312 after the data is "cleansed." For example, the owner of an asset at the second edge implementation 312 might not feel comfortable transmitting specific champion data to the cloud 350. As a result, the champion data might undergo a process associated anonymization, de-identification, summarization, normalization, a determination that at least some information in the edge portion will not be transmitted to the cloud portion in accordance with a lifecycle manager policy (e.g., policies can be established to prevent the transmission of certain types of data), etc. prior to being transmitted to the cloud 350. The cloud 350 may then evaluate the challenger at 540 and instruct the second edge implementation 312 to replace the champion when appropriate at 550. Note that in this implementation, the analysis might use some information from the second edge implementation 312 to improve the performance of algorithms at other edge implementations. For example, even without all of the performance details the analysis might still be able to recognize that some challengers work better than others in a particular context.

Figure 6:
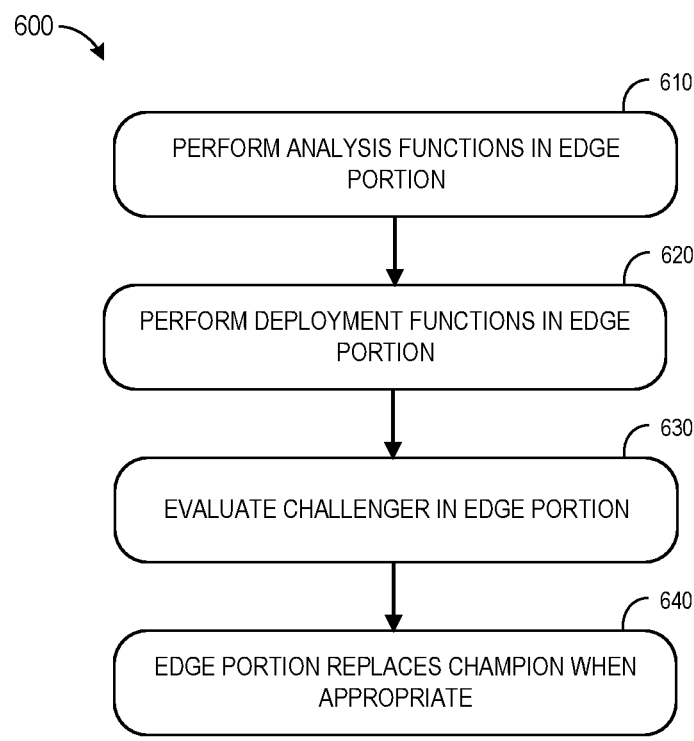
FIG. 6 is a method associated with an edge-based implementation in accordance with some embodiments.

Referring again to FIG. 3, in some cases at least some of the algorithm analysis engine and deployment platform are implemented in an edge portion at an industrial site associated with the live environment. For example, in the third edge implementation 313 all of the analysis and deployment is performed at the third edge implementation 313. FIG. 6 is a method 300 associated with an edge-based implementation in accordance with some embodiments. At 610, the analysis functions are performed at the third edge implementation 313 (e.g., to select a potential challenger). At 620, the deployment functions are performed at the third edge implementation 313. The third edge implementation 313 may then evaluate the challenger at 630 and instruct the first edge implementation 311 to replace the champion when appropriate at 640. Note that in this implementation, the analysis and deployment might not be able to use information from the third edge implementation 313 to improve the performance of algorithms at other edge implementations.

Figure 7:
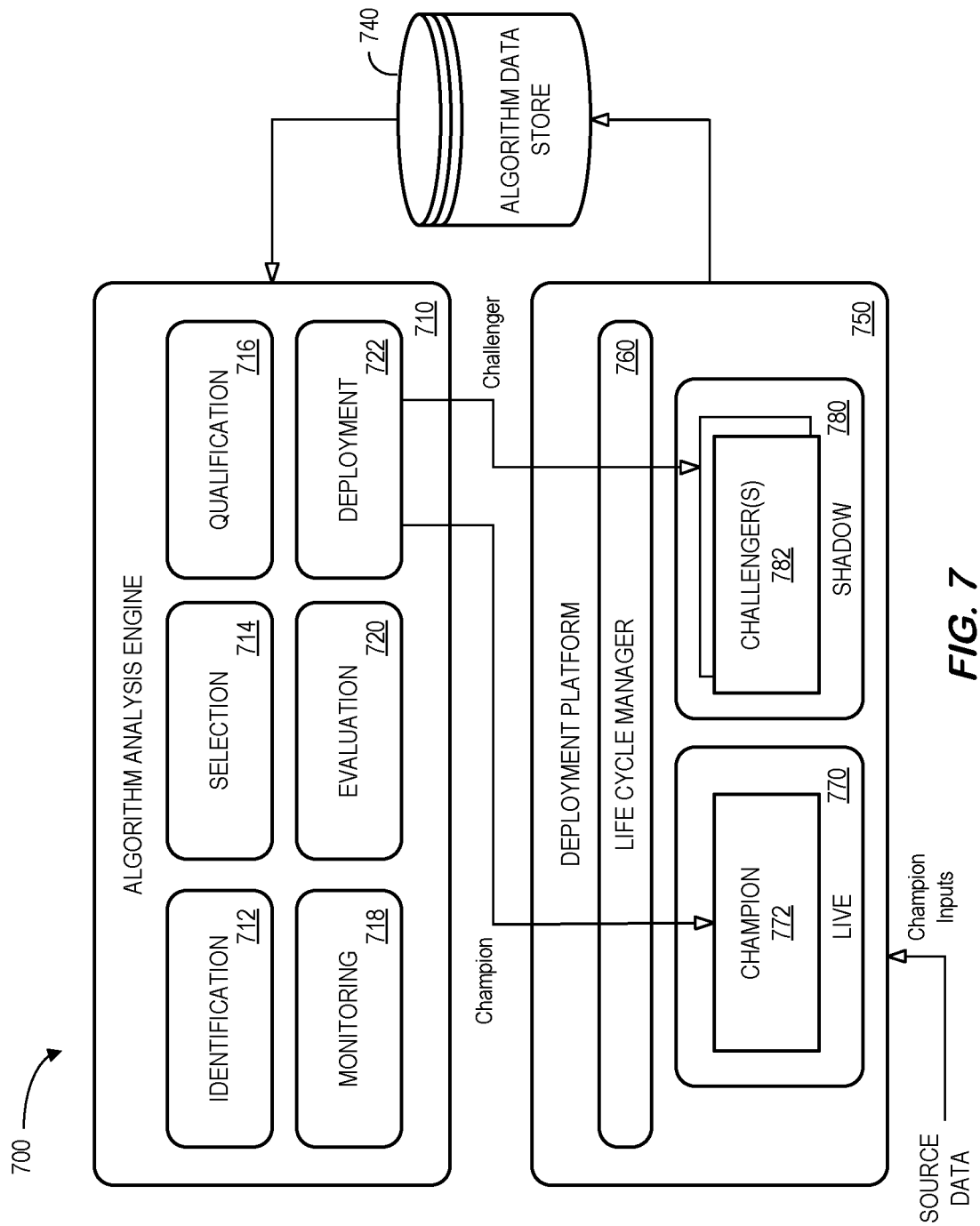
FIG. 7 is a more detailed view of a challenger deployment system according to some embodiments.

FIG. 7 is a more detailed view of a challenger deployment system 700 associated with a current or "champion" algorithm 772 executing in a real or "live" environment 770 (e.g., a factory, wind turbine, jet engine, dam, etc.) according to some embodiments. As before, the system 700 includes a deployment platform 750 able to write information to an algorithm data store 740.

According to some embodiments, the algorithm data store 740 stores electronic records containing, for example, a catalog with metadata about a pool of available algorithms that could potentially replace the champion algorithm 772. According to some embodiments, the deployment platform 750 and/or other elements of the system such as an algorithm analysis engine 710 may then determine which of those algorithms should be evaluated and compared to the champion algorithm 772. This might be done, for example, by one or more selecting algorithms to be executed as "challenger" algorithms 782 consuming source data in a shadow environment 780. Note that the live environment 770 may provide a separate area for the champion 772 to run. Thus, the deployment platform 750 may provide separation of the champion 772 (live 770) and challenger 782 (shadow 780) environments to help ensure that resources to the champion 772 are not compromised or impacted. Moreover, the shadow environment 780 may be kept flexible to host one or more challengers 782. According to some embodiments, the shadow environment 780 also provides a sandbox for experiments with hybrid or ensemble champions.

The deployment platform 750 may further include a lifecycle manager 760 that monitors the context and environment for determining the appropriate time to execute the challenger(s) 782. In certain cases, challengers 782 may run in parallel to the champion 772. In mission critical cases, the challengers 782 might be run during a down time or slow cycle. The lifecycle manager 760 may also determine how and when a champion 772 is to be replaced by one or more challengers 782, or when one or more challengers 782 will be removed. The lifecycle manager 760 might collect performance data and decides how much of the data (if any) will be sent to the cloud. The lifecycle manager 760 might, according to some embodiments, send only processed data or a subset of the raw data to the cloud, based on customer policy, security, resource management, etc.

The algorithm analysis engine 710 may manage the identification process 712, selection process 714, and qualification process 716 in accordance with any of the embodiments described herein. The algorithm analysis engine 710 may also inform the lifecycle manager 760 of available updates to the champion 772 or challenger(s) 782 and the existence of new challengers 782. The algorithm analysis engine 710 may also provide a mechanism to download the challengers 782 to the deployment platform 750. According to some embodiments, the algorithm analysis engine 710 may further execute a monitoring process 718, an evaluation process 720, a deployment process 722, etc.

The algorithm data store 740 may contain performance and execution data of the champion 772 and challengers 782. The algorithm data store 740 might not be used, in some embodiments, to store the input data that is proprietary to the industrial site. Data about the performance of the champion 772 and challenger 782 in comparative environments, their resource utilization, and contextual or environmental information are examples of data that might be stored in the algorithm data store 740. This information may be used by the algorithm analysis engine 710 to learn and make decisions on champion 772 vs. challenger 782 effectiveness, applicability, feasibility, etc. Note that in the case of an isolated edge deployment, the analysis and learnings might be limited to a single edge site and may not leverage learnings from sister edge sites until a deliberate decision to download an upgrade is made. Deploying to multiple edge sites may enable cross-site learnings and richer champion-challenger outcomes.

Figure 8:
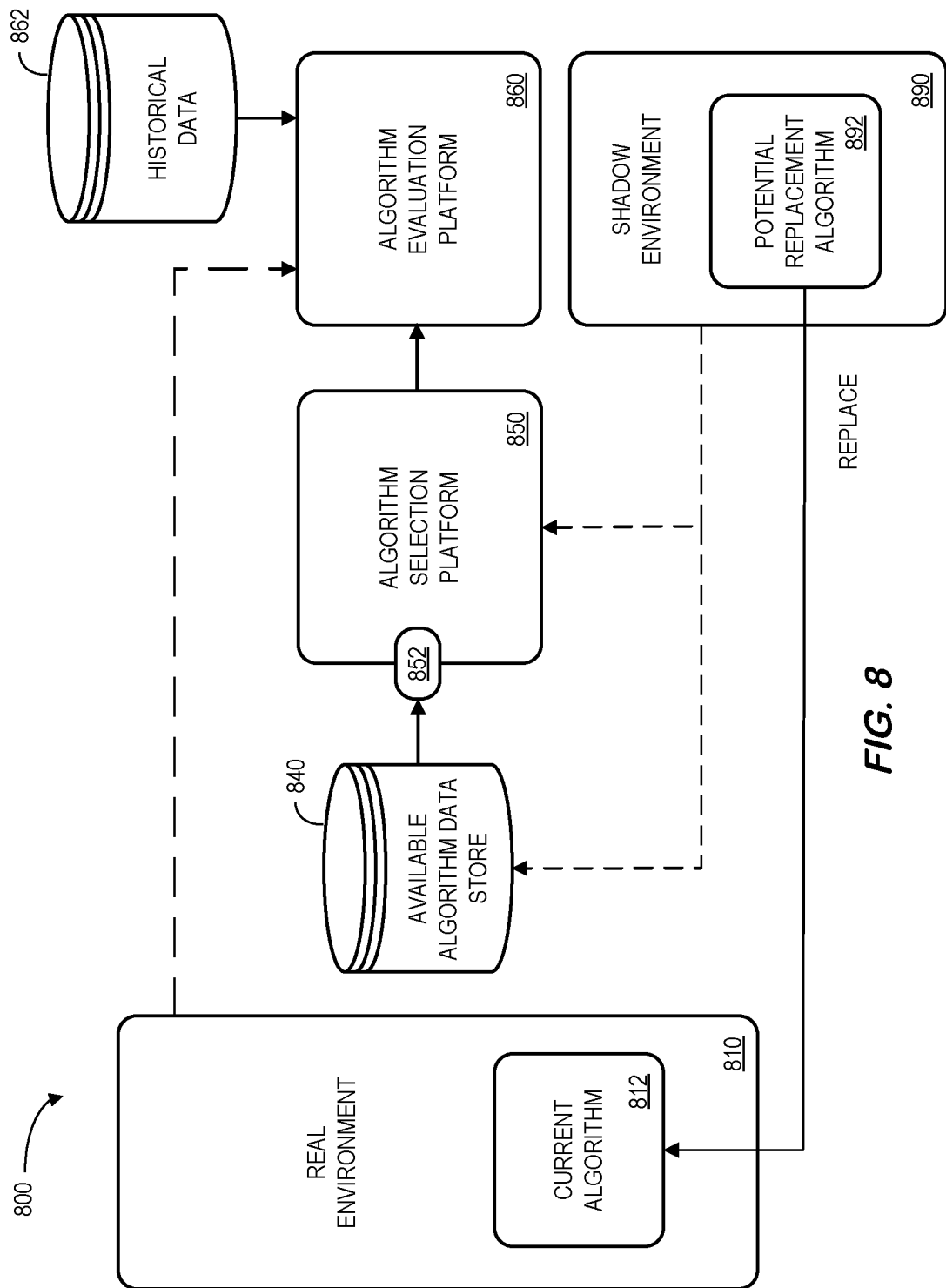
FIG. 8 is a block diagram of a system according to some embodiments.

The system 700 of FIG. 7 may comprise a platform that can be flexibly used to select and evaluate replacement algorithms and improve the operation of an industrial asset. For example, FIG. 8 is a block diagram of a system 800 associated with a current algorithm 812 executing in a real environment 810 according to some embodiments. The system 800 includes an algorithm selection platform 850 with a communication port 852 to access information in an available algorithm data store 840.

According to some embodiments, the available algorithm data store 840 stores electronic records containing, for example, a catalog with metadata about a pool of available algorithms that could potentially replace the current algorithm 812. According to some embodiments, the algorithm selection platform 850 and/or other elements of the system may then determine which of those algorithms should be evaluated and compared to the current algorithm 812. The system 800 further includes an algorithm evaluation platform 860 that arranges for one or more potential replacement algorithms 892 to safely execute in a shadow environment 890 (such that the real environment 810 is not impacted by the evaluation). The shadow environment 890 might utilize, for example, historical data 862 or a stream of substantially real-time data from the real environment 810. If the performance of the potential replacement algorithm 892 exceeds that of the current algorithm 812, the system 800 may replace the current algorithm 812 and thus improve future performance in the real environment 810. Information about evaluations (including poor results) can also be fed back into the available algorithm data store 840 and/or the algorithm selection platform 850 to improve future selections.

Thus, the algorithm selection platform 850 may access information about a pool of available algorithms from an available algorithm data store 840. The available algorithm data store 840 might include metadata associated with a catalog of potential algorithms, including an algorithm identifier, a description of the algorithm, an implementation type (e.g., source code, executable, data, etc.), and/or a software version number. The algorithm metadata might also include, for example, input data (e.g., the type and format of the input data), output data (e.g., the type and format of the output data), and/or a resource requirement (e.g., an amount of memory, computing resources, sensor types, etc. needed to support the algorithm). Other examples of algorithm metadata include context information, historical performance data (e.g., "this algorithm was replaced by a better algorithm on Jan. 1, 2020"), an author (e.g., a person, enterprise, or program that created the algorithms), compliance information (e.g., indicating that the algorithm meets safety standards, governmental regulations, etc.), license information (e.g., indicating that the algorithm is license free, that a license was purchased until an expiration data, etc.).

The system 800 may compare the information about each of the pool of available algorithms with at least one requirement associated with the current algorithm 812 executing in the real environment 810. For example, the at least one requirement associated with the current algorithm 812 executing in the real environment 810 might include an input type and/or an input format (e.g., algorithm needs to accept a video input stream). Similarly, the requirement might include an output type and/or an output format (e.g. the algorithm must generate a probability of failure from 0 to 100%). As still another example, the requirement might represent a resource requirement (e.g., the algorithm requires a processor capable of performing a pre-determined number of operations per second).

The system 800 may automatically determine algorithm execution "context" information. As used herein, the term "context" might refer to any parameter, condition, state, etc. that effects operation of an algorithm. By ways of examples only, context might be associated with a geographic location, a weather condition, a time of day, another algorithm, a cloud edge environment, historical data, and/or specific hardware. In some cases, the context information might be based on a priori information, such as the knowledge of an expert in the field. In other cases, the context information might be based on a deep learning model (e.g., when a large amount of data is available) and/or a sparse learning technique (e.g., utilizing a graph). Note that context information could be associated with a directly measured value, an inferred value, a genetic algorithm (e.g., with various mutations being compared), etc. According to some embodiments multiple types of algorithm execution context information might be determined. For example, one algorithm might be particularly effective in the daytime when the temperature is over 95° F. Note that the term context may also refer to any possible "hidden parameter" (i.e., something that affects the operation of, or result of, an algorithm but is not, usually, an explicit parameter). Typically, "context" may be an assumption inside a programmer's head in the sense that they only thought about running the algorithm under certain conditions. Later, it might be determined in the field that there are other conditions the programmer didn't think of (so it's not a parameter or even part of the developer documentation). For example, a system might achieve higher accuracy when the temperature is over 0° C. (when the developer implicitly assumed it would always be run at room temperature and therefore didn't consider possible sensitivity to the ambient temperature).

Based on the comparison and the algorithm execution context information, the system 800 may select at least one of the pool of available algorithms as a potential replacement algorithm. For example, some algorithms will not be appropriate to replace the current algorithm (e.g., because they generate the wrong type of output or need computing resources that are not available in the real environment).

The system 800 may then transmit an indication of the selected at least one potential replacement algorithm. For example, the indication of a selected potential replacement algorithm might be transmitted to the algorithm evaluation platform 860. The algorithm evaluation platform 860 may then arrange for the at least one potential replacement algorithm 892 to execute in the shadow environment 890. Note that execution in the shadow environment 890 might be based on historical data 862 associated with the real environment 810 or a substantially real-time stream of information from the real environment 810. The algorithm evaluation platform 860 may then compare performance of the at least one potential replacement algorithm 892 with performance of the current algorithm 812 in the real environment 810 (e.g., based on an accuracy, a precision, a level of confidence, speed, compute resources, any other computing criteria, etc.). When the performance of a potential replacement algorithm 892 exceeds performance of the current algorithm 812 in the real environment 810, the system 800 may arrange for that potential replacement algorithm 892 to become the current algorithm 812.

Figure 9:
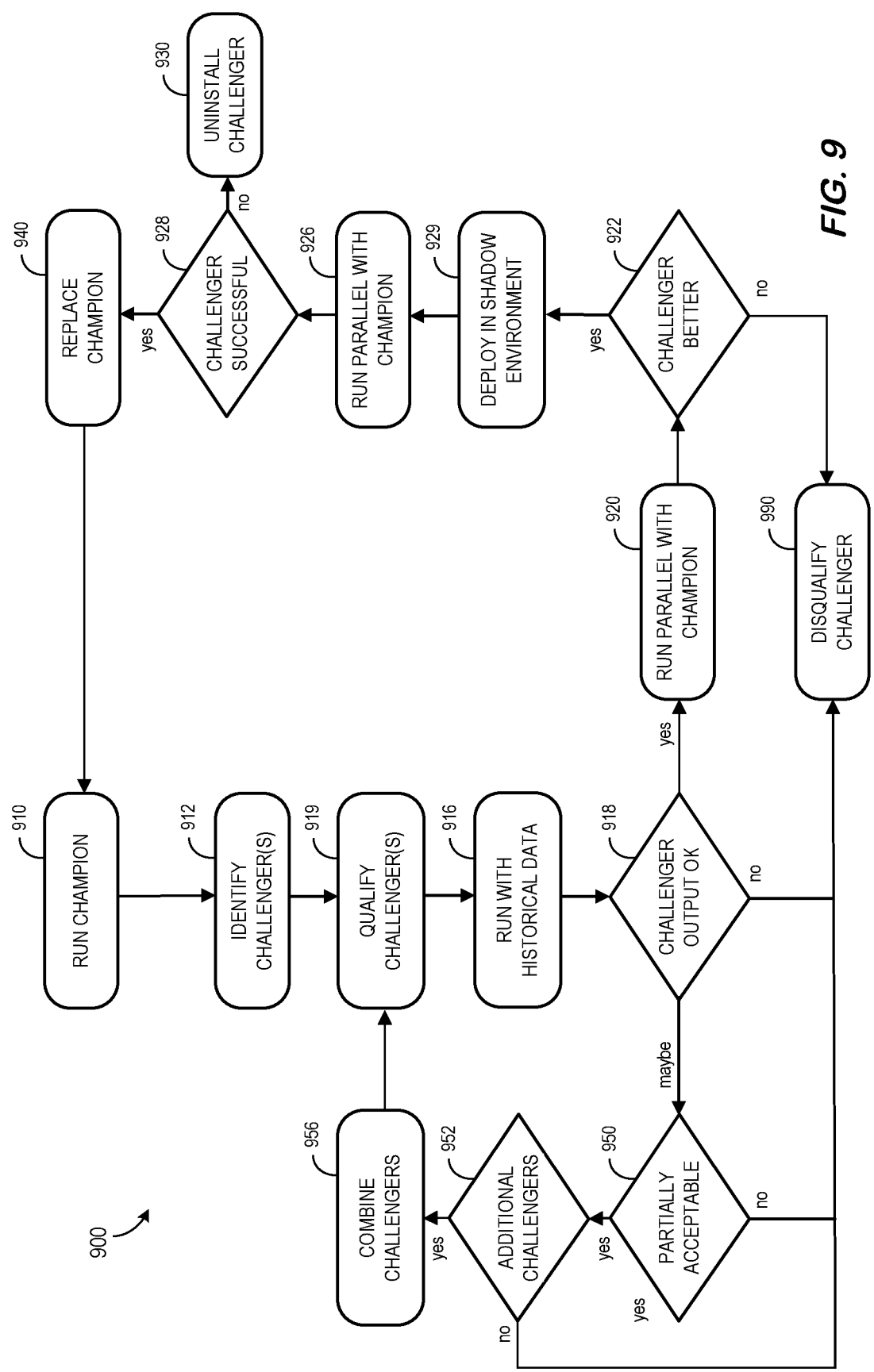
FIG. 9 is a champion/challenger process flow according to some embodiments.

FIG. 9 is a champion/challenger process flow 900 according to some embodiments. Initially, the system may run or execute a current algorithm or "champion" at 910. The system may then identify one or more potential replacement algorithms or "challengers" at 912 and determine if they are qualified at 914 (e.g., create an appropriate output). The system may then run the algorithm with historical data at 916. If the results of the algorithm with historical data are not acceptable at 918, the challenger is disqualified at 990 (that is, the algorithm cannot replace the champion).

If the results of the algorithm with historical data are acceptable at 918, the challenger is run in parallel with the champion at 920. For example, the challenger might be run in a shadow environment to provide a "safe" execution such that it cannot introduce any side effects into the real environment (e.g., computer viruses, malfunctions, etc.). Optionally, embodiments might simulate what the state of the system would have been had it based any decisions affecting the environment on the output of the challenger. If the challenger does not outperform the champion at 922, it is disqualified at 990. If the challenger does outperform the champion at 922, it is deployed in a shadow environment at 924 for further evaluation and run in parallel with the champion in the real environment at 926. If the challenger is not successful at 928, it is uninstalled at 930 and the champion remains the current algorithm. If the challenger is successful at 928, it replaces the campion at 940 and the process continues at 910.

In some cases, the result of a challenger's performance at 918 might be "borderline" (that is, the results might be interesting but not exactly right to replace the champion). As a result, if the output is not at least partially acceptable at 950, the challenger is disqualified at 990. If the output is at least partially acceptable at 950, the system may search for additional algorithms to enhance or otherwise adjust the challenger at 952. If no additional algorithms are identified at 952, the challenger is disqualified at 990.

If additional algorithms are identified at 952, the system may attempt to combine the algorithm at 956 (to create a new hybridized or composite algorithm). This new algorithm can then be qualified at 914. Thus, according to some embodiments, a plurality of algorithm components may be automatically combined to create a potential replacement algorithm. Note that the combination might be based at least in part on algorithm execution context information. For example, the output of a first algorithm component might be used as an input for a second algorithm component. Similarly, the output of the second algorithm component might be used as an input of a third algorithm component. In this way, algorithms may be automatically "chained" together to perform a series of tasks. Note that more complicated assemblies may be provided. Also note that an existing champion algorithm might be part of a new hybridized algorithm. For example, consider a champion algorithm that performs well during the day (but not a night) and a challenger algorithm that performs well at night (but not during the day). In this case, the system may hybridize a new algorithm that uses the champion algorithm during the day and the challenger algorithm at night.

Thus, some embodiments may divide a particular process into parts, steps or particular actions, each of which is represented by some code (e.g., controllers, analytics, etc.). Each of these may be labeled with metadata describing the general problem or function they have (e.g., perception and classification of spalls on turbine blades might be generally a spall-detector), the specific input requirements, resource requirements and output characterization (e.g., Red-Green-Blue ("RGB") camera, 2 GiB memory, 120 GLOPS (billions of floating point operations), predicate (will return a "yes" or "no" result), confidence (will express confidence in a range of $0_{|}000$), etc. These are used as selection criteria by a particular system when it wants to update or replace an existing function. Note that the system may specifically filter using this metadata based on the available resources and timeline to ensure that the challenger has the potential for successful replacement or improvement of the current solution. Mismatches may either disqualify a challenger or force a planner/scheduler to create a chain of functions (inferring the requirements and performance for the chain based on metadata) to see if it is competitive. For example, if the existing champion is a predicate indicating a spall, and a potential challenger is a function that indicates the degree of spall damage, then a thresholding function might be added to allow the function to correctly replace the existing predicate. The resources needed to run such a function might then be added to the footprint of the challenger.

The metadata, based on prior experience with the function, may include dynamic technical data about catalog challengers and champions (e.g., precision of the result, accuracy, and the precision and accuracy of its own measure of these values). This information can be used to determine if a challenger properly outperforms the champion (that is all measures are equal or better) or is a partial solution (whose appropriateness may be context dependent). According to some embodiments, some measurements are performed with respect to a particular context (e.g. the best "cat" detector may work well when the environment is well lit and clear blue skies, but on overcast days one that does not work as well on clear days may exceed the performance of the champion). Being able to classify performance by context, and not requiring all contexts to be identified a priori, may lead to better results. According to some embodiments, the system may determine what is different about the current context when performance of a particular challenger or champion differs from historic medians, and it is that identification (which might be determined using reinforcement learning) that helps the system eventually learn new labels for such algorithms. This new information can then be added to the metadata which can then be used as part of the matching criteria.

Rather than simply designating a particular asset as "an improvement," some embodiments allow the introduction of specific situational contexts that can be learned to classify when the asset is better. That is, the system may learn more about the world through identifying these situations without any a priori knowledge of situation classification. As a result, the matching of assets to those that are likely to be better for a situation at hand (as well as the computational and other resource constraints of the using device) may be improved. Over time, the system may hybridize assets to make sure they not only can be used by the asset to solve the same problem as a prior champion, but can also over time change the architecture through simplification of the analytic chain to take advantage of higher degrees of output dimensionality. For example, when a predicate is currently used, the system may substitute another function and turn it into a predicate, and may perhaps eventually learn to use the functional output without thresholding.

Figure 10:
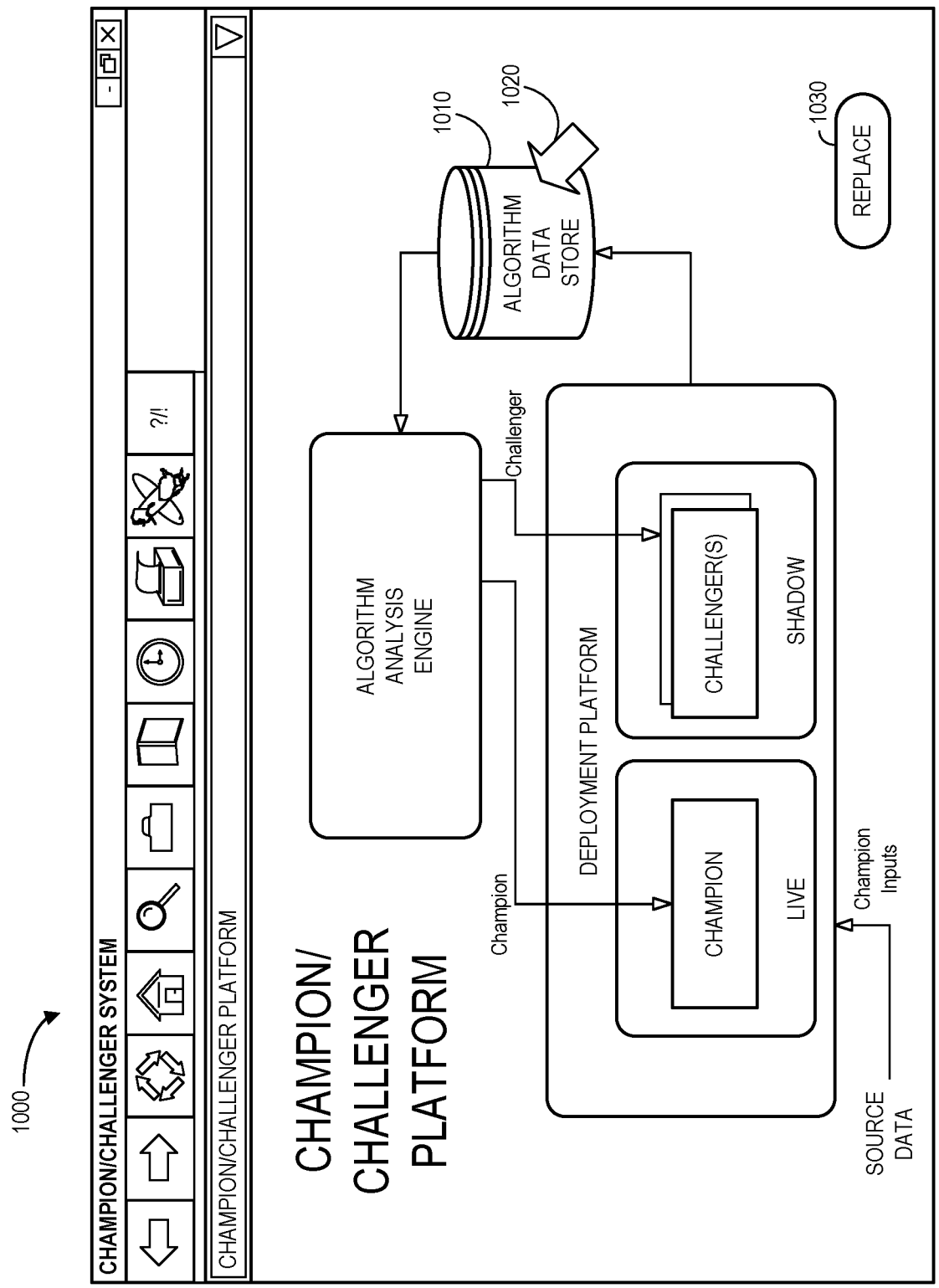
FIG. 10 illustrates a computer display in accordance with some embodiments.

In some cases, a display may provide information to an operator or administrator and/or allow him or her to make adjustments to the system. For example, FIG. 10 illustrates a champion/challenger display 1000 that might utilize an interactive graphical user interface. The display 1000 might comprise a graphical overview 1010 of a champion/challenger system including an algorithm analysis engine, a deployment platform, an algorithm data store, etc. Selection of an element on the display 1000 (e.g., via a touch screen or computer mouse pointer 1020) might result in further information about that element being presented (e.g., in a pop-up window) and, in some cases, allow for an adjustment to be made in connection with that element. In addition, selection of a "Replace" icon 1030 might trigger movement of a challenger algorithm to the live environment.

Figure 11:
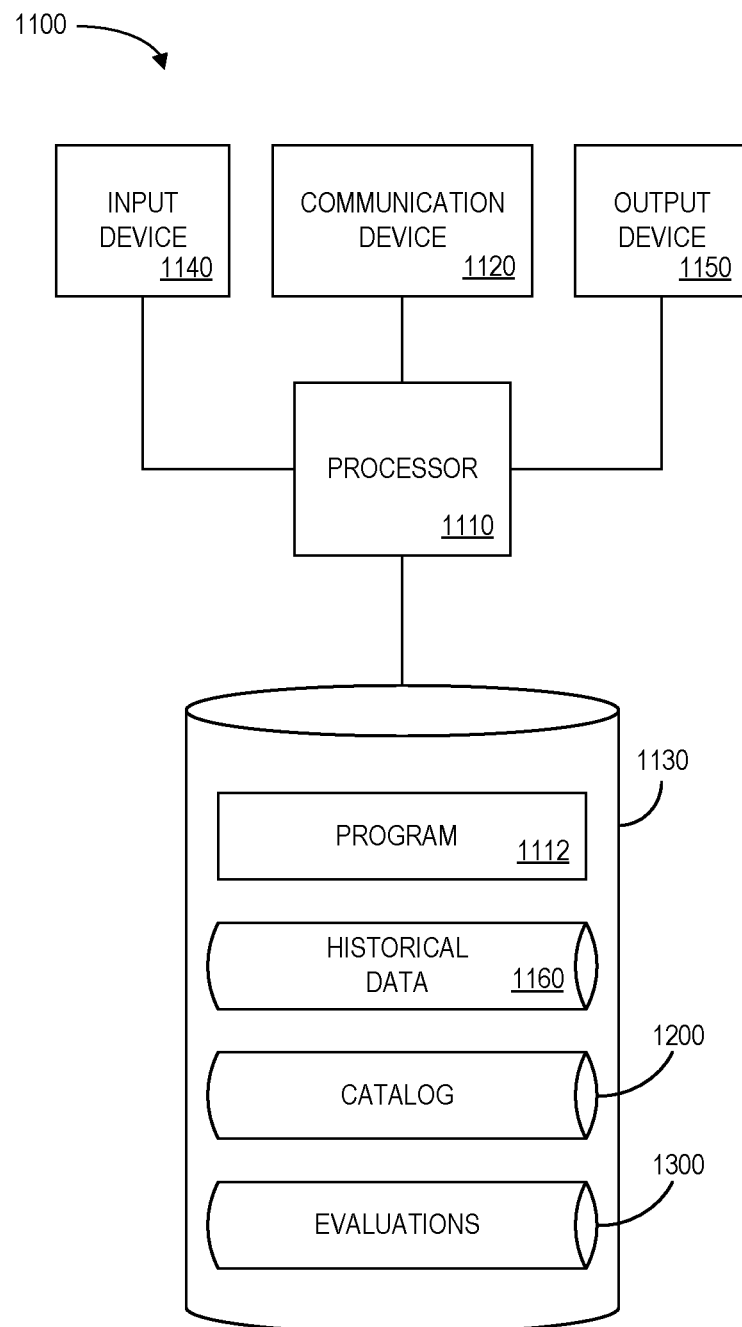
FIG. 11 illustrates a platform according to some embodiments.

Embodiments described herein may comprise a tool that facilitates selection of potential replacement algorithms and may be implemented using any number of different hardware configurations. For example, FIG. 11 illustrates a platform 1100 that may be, for example, associated with the systems 100, 700 of FIGS. 1 and 7, respectively (as well as other systems described herein). The platform 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more administrators, catalogs, etc. Note that communications exchanged via the communication device 1120 may utilize security features, such as those between a public internet user and an internal network of an insurance enterprise. The security features might be associated with, for example, web servers, firewalls, and/or PCI infrastructure. The platform 1100 further includes an input device 1140 (e.g., a mouse and/or keyboard to enter information about algorithms, environments, etc.) and an output device 1150 (e.g., to output status reports, generate alert messages, etc.).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or network security service tool or application for controlling the processor 1110. The processor 1110 performs instructions of the program 1112, and thereby operates in accordance with any of the embodiments described herein. For example, the processor 1110 may compare the information about each of a pool of available algorithms with at least one requirement associated with a current algorithm executing in a live environment. Based on the comparison, the processor 1110 may select at least one of the pool of available algorithms as a potential replacement algorithm and transmit an indication of the selected at least one potential replacement algorithm. The processor 1110 may include a lifecycle manager that manages execution of the current algorithm in the live environment. The processor 1110 may also receive the indication of the selected at least one potential replacement algorithm, manage execution of the at least one potential replacement algorithm in a shadow environment, and report performance information associated with the current algorithm and the at least one potential replacement algorithm.

The program 1112 may be stored in a compressed, uncompiled and/or encrypted format. The program 1112 may furthermore include other program elements, such as an operating system, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as shown in FIG. 11), the storage device 1130 further stores historical data 1160 (e.g., information generated by prior algorithms executing in real environments), a catalog 1200, and evaluations 1300. Example of databases that might be used in connection with the platform 1100 will now be described in detail with respect to FIGS. 12 and 13. Note that the databases described herein are only examples, and additional and/or different information may be stored therein. Moreover, various databases might be split or combined in accordance with any of the embodiments described herein. For example, the historical data 1160 and catalog 1200 might be combined and/or linked to each other within the program 1112.

Referring to FIG. 12, a table is shown that represents the catalog 1200 that may be stored at the platform 1100 in accordance with some embodiments. The table may include, for example, entries identifying algorithms that are available to be incorporated into a real environment. The table may also define fields 1202, 1204, 1206, 1208 for each of the entries. The fields 1202, 1204, 1206, 1208 may, according to some embodiments, specify: an algorithm identifier 1202, metadata 1204, context 1206, and a status 1208. The catalog 1200 may be created and updated, for example, when new algorithms are added to a system, results of evaluations are received, etc.

The algorithm identifier 1202 may be, for example, a unique alphanumeric code identifying code, formula, applications, etc. that might be executed in a real or shadow environment. The metadata 1204 might be any information that describes the algorithm, including, for example, inputs, outputs, resource requirements, performance metrics, etc. The context 1206 might indicate any condition that impacts operation of the algorithm (e.g., time of day, weather, location, etc.). The status 1208 might indicate if the algorithm is currently the champion, is being evaluated, is not suitable to replace a current algorithm, etc.

Figure 13:
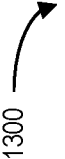
FIG. 13 is a portion of a tabular evaluation data store according to some embodiments.

Referring to FIG. 13, a table is shown that represents the evaluations 1300 that may be stored at the platform 1100 in accordance with some embodiments. The table may include, for example, entries identifying algorithms that have been evaluated by an algorithm evaluation platform. The table may also define fields 1302, 1304, 1306, 1308, 1310, 1312, 1314 for each of the entries. The fields 1302, 1304, 1306, 1308, 1310, 1312, 1314 may, according to some embodiments, specify: an algorithm identifier 1302, an evaluation 1304, a date and time 1306, a qualified indication 1308, an accuracy 1310, a precision 1312, and a variance 1314. The evaluations 1300 may be created and updated, for example, as algorithms are evaluated as potential challengers to a current champion.

The algorithm identifier 1302 may be, for example, a unique alphanumeric code identifying code, formula, applications, etc. that might be executed in a live or shadow environment and might be based on or associated with the algorithm identifiers 1202 stored in the catalog 1200. The evaluation 1304 might describe how the evaluation was (or will be performed), such as by using historical data, which environment was used during the test, whether the evaluation was hosted in the cloud or at an edge, etc. The date and time 1306 might indicate when the evaluation was performed. The qualified indication 1308 might reflect that evaluation results are pending, the algorithm is not qualified to be a challenger, etc. The evaluations 1300 may also store results of the evaluations such as the accuracy 1310, the precision 1312, the variance 1314, etc.

Thus, some embodiments described herein may have a technical advantage in that they provide higher fidelity analysis and learning with access to real data as compared to traditional approaches. Moreover, embodiments may provide the ability to scale vertically (over a large number of champion-challengers) and horizontally (agnostic to the domain). According to some embodiments, data collection and learning may be performed parallel to uninterrupted execution of the champion and/or allow for zero downtime when champion updates are performed.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information described herein may be combined or stored in external or cloud-based systems).

Some embodiments have been described with respect to information associated with an "industrial asset," which might include, for example, sensors, actuators, controllers, financial institutions, military devices, etc. Moreover, note that embodiments described herein might be associated with cyber-security systems that monitor one or more industrial assets, power generation, Unmanned Aerial Vehicle ("UAV") fleets, propulsion, healthcare scanners, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a live environment executing a current algorithm, comprising:
   an algorithm data store containing information about a pool of available algorithms;
   an algorithm analysis engine, at least a portion of which is implemented in a cloud portion of a cloud-to edge implementation, coupled to the algorithm data store, including:
      a data connection to access the information about the pool of available algorithms, and
      at least one analysis computer processor coupled to the data connection and adapted to:
         compare the information about each of the pool of available algorithms with at least one requirement associated with the current algorithm executing in the live environment,
         based on said comparison and algorithm execution context information of an edge portion at an industrial site associated with the live environment, select at least one of the pool of available algorithms as a potential replacement algorithm, and
         transmit an indication of the selected at least one potential replacement algorithm; and
   a deployment platform, at least a portion of which is implemented in the edge portion at the industrial site associated with the live environment, coupled to the algorithm data store and algorithm analysis engine, including:
      a lifecycle manager adapted to:
         manage execution of the current algorithm in the live environment,
         receive from the algorithm analysis engine the indication of the selected at least one potential replacement algorithm,
         manage execution of the at least one potential replacement algorithm in a shadow environment in a manner that does not alter the live environment, and
         report performance information associated with the current algorithm and the at least one potential replacement algorithm.

2. The system of claim 1, wherein information received from the edge portion is used to enhance algorithm performance at another edge portion.

3. The system of claim 1, wherein at least some information from the edge portion, prior to being transmitted to the cloud portion, undergoes a process associated with at least one of: (i) anonymization, (ii) de-identification, (iii) summarization, (iv) normalization, and (v) a determination that at least some information in the edge portion will not be transmitted to the cloud portion in accordance with a lifecycle manager policy.

4. The system of claim 1, wherein the algorithm analysis engine is further associated with at least one of: (i) an identification process, (ii) a selection process, (iii) a qualification process, (iv) a monitoring process, (v) an evaluation process, and (vi) a deployment process.

5. The system of claim 1, wherein the algorithm analysis engine is further to compare performance of the at least one potential replacement algorithm with performance of the current algorithm in the live environment.

6. The system of claim 5, wherein the algorithm analysis engine is further adapted to:
   when the performance of a potential replacement algorithm exceeds performance of the current algorithm in the live environment, arrange for that potential replacement algorithm to become the current algorithm.

7. The system of claim 5, wherein the comparison of performances is based on at least one of: (i) an accuracy, (ii) a precision, (iii) a level of confidence, (iv) speed, (v) compute resources, and (vi) any other computing criteria.

8. The system of claim 1, wherein the information about the pool of available algorithms comprises metadata including at least one of: (i) an identifier, (ii) a description, (iii) an implementation type, (iv) a version, (v) input data, (vi) output data, (vii) a resource requirement, (viii) context information, (ix) historical performance data, (x) an author, (xi) compliance information, and (xii) license information.

9. The system of claim 1, wherein the algorithm execution context information is automatically selected based on at least one of: (i) a deep learning model, and (ii) a sparse learning technique.

10. A method associated with a live environment executing a current algorithm, comprising:
- accessing, by an algorithm analysis engine at least a portion of which is implemented in a cloud portion of a cloud-to-edge implementation, an algorithm data store containing information about a pool of available algorithms;
- comparing, by the algorithm analysis engine, the information about each of the pool of available algorithms with at least one requirement associated with the current algorithm executing in the live environment;
- based on said comparison and algorithm execution context information of an edge portion at an industrial site associated with the live environment, selecting, by the algorithm analysis engine, at least one of the pool of available algorithms as a potential replacement algorithm;
- transmitting, by the algorithm analysis engine, an indication of the selected at least one potential replacement algorithm;
- managing, by a lifecycle manager at a deployment platform at least a portion of which is implemented in the edge portion at the industrial site associated with the live environment, execution of the current algorithm in the live environment;
- receiving, by the lifecycle manager from the algorithm analysis engine, the indication of the selected at least one potential replacement algorithm;
- managing, by the lifecycle manager, execution of the at least one potential replacement algorithm in a shadow environment in a manner that does not alter the live environment; and
- reporting, by the lifecycle manager, performance information associated with the current algorithm and the at least one potential replacement algorithm.

11. A non-transitory, computer-readable medium storing program code, the program code executable by a computer processor of an algorithm selection platform to cause the platform to perform a method associated with a live environment executing a current algorithm comprising:
- accessing, by an algorithm analysis engine at least a portion of which is implemented in a cloud portion of a cloud-to-edge implementation, an algorithm data store containing information about a pool of available algorithms;
- comparing, by the algorithm analysis engine, the information about each of the pool of available algorithms with at least one requirement associated with the current algorithm executing in the live environment;
- based on said comparison and algorithm execution context information of an edge portion at an industrial site associated with the live environment, selecting, by the algorithm analysis engine, at least one of the pool of available algorithms as a potential replacement algorithm;
- transmitting, by the algorithm analysis engine, an indication of the selected at least one potential replacement algorithm;
- managing, by a lifecycle manager at a deployment platform at least a portion of which is implemented in the edge portion at the industrial site associated with the live environment, execution of the current algorithm in the live environment;
- receiving, by the lifecycle manager from the algorithm analysis engine, the indication of the selected at least one potential replacement algorithm;
- managing, by the lifecycle manager, execution of the at least one potential replacement algorithm in a shadow environment in a manner that does not alter the live environment; and
- reporting, by the lifecycle manager, performance information associated with the current algorithm and the at least one potential replacement algorithm.

* * * * *